Figure 1:
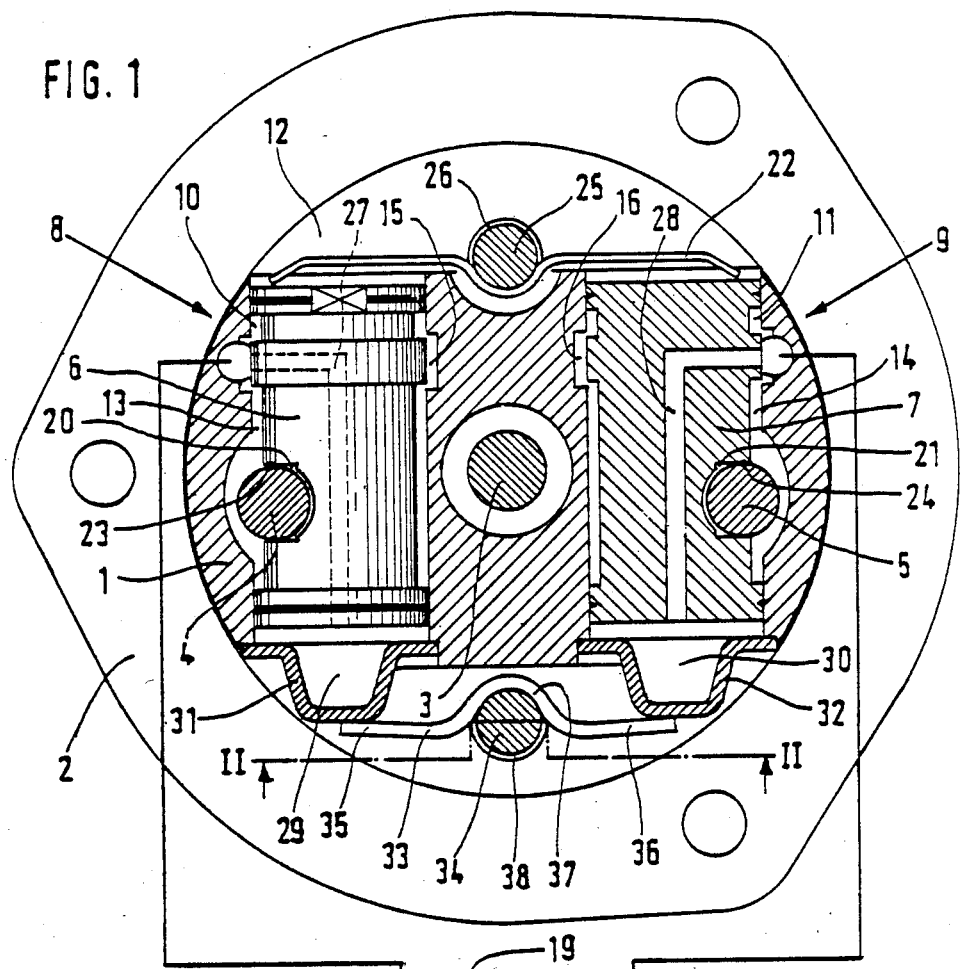

United States Patent [19]

Lang et al.

[11] Patent Number: 4,590,965
[45] Date of Patent: May 27, 1986

[54] PRESSURE AGENT CONTROL ARRANGEMENT FOR AUXILIARY POWER STEERING MECHANISMS

[75] Inventors: Armin Lang, Schwabisch Gmund; Helmut Knödler, Lorch, both of Fed. Rep. of Germany

[73] Assignee: Zahnradfabrik Friedrichshafen, AG., Friedrichshafen, Fed. Rep. of Germany

[21] Appl. No.: 713,406

[22] PCT Filed: May 4, 1984

[86] PCT No.: PCT/EP84/00133
§ 371 Date: Mar. 15, 1985
§ 102(e) Date: Mar. 15, 1985

[87] PCT Pub. No.: WO85/00565
PCT Pub. Date: Feb. 14, 1985

[30] Foreign Application Priority Data

Jul. 23, 1983 [LU] Luxembourg ....... PCT-EP83/00196

[51] Int. Cl.[4] ............................... F15B 9/08
[52] U.S. Cl. ..................... 137/596; 91/372; 91/375 A; 91/434

[58] Field of Search ................ 91/370, 371, 372, 373, 91/375 A, 434, 465; 137/596; 180/132; 24/155 C, 331, 340

[56] References Cited

U.S. PATENT DOCUMENTS

| 3,423,939 | 1/1969 | Lewis et al. | 60/452 X |
| 3,917,018 | 11/1975 | Strauff | 91/434 X |
| 3,922,953 | 12/1975 | Strauff | 91/434 X |
| 3,954,149 | 5/1976 | Strauff | 91/434 X |
| 4,022,110 | 5/1977 | Strauff | 91/465 X |

FOREIGN PATENT DOCUMENTS 1154851 6/1969 United Kingdom .

Primary Examiner—Gerald A. Michalsky
Attorney, Agent, or Firm—Zalkind & Shuster

[57] ABSTRACT

A booster steering valve control device of the kind having a rotative valve body within a steering housing with a pair of piston valves operative upon rotation of a steering spindle is provided with reaction chambers at corresponding ends of the piston valves. The reaction chambers are isolated from an inlet chamber within the steering housing by means of closure caps. The closure caps are secured in place by a resilient clamp held by a bolt carried in a bore of the valve body in which the valve pistons are reciprocal.

7 Claims, 2 Drawing Figures

PRESSURE AGENT CONTROL ARRANGEMENT FOR AUXILIARY POWER STEERING MECHANISMS

BACKGROUND OF THE INVENTION

In dual piston valve constructions for booster steering control of this kind described herein it has heretofore been known to utilize reaction chambers at corresponding ends of reciprocal piston valves wherein the reaction chambers have closure caps secured by heavy bars bolted to the steering housing which contains the valve pistons. Such constructions are shown in German Pat. No. 12 38 789 and British Pat. No. 1,154,851.

In the prior art patents, the closure gaps are maintained in engagement with the valve body by means of a heavy holding bridge attached by a screw which is secured with a locking plate. This arrangement is expensive and in the case of an insufficient security of the holding screw there is a danger of loosening of the screw and thus of jeopardizing the steering function of the device.

This application is cross-referenced to the application of the same inventors, Armin Lang and Helmut Knodler, Ser. No. 713,407, filed Mar. 15, 1985, and assiged to the same Assignee.

BRIEF DESCRIPTION OF THE PRESENT INVENTION

In the present invention a simplification is effected in a safe manner by means of a clamp engaging the closure caps secured by a pin fixed in a bore of the valve body. The pin is disposed transversely of the axes of the valve pistons, intermediate the valve pistons and locks a resilient bar or clamp against the closure caps. Such pin is provided with a neckdown or recessed portion into which the clamp fits so as to lock the clamp against shifting transversely of itself. Accordingly, a loosening of the pin as well as the resilient clamp is virtually impossible.

Nevertheless, this assembly is simply removable by forcing the resilient clamp away from the pin with a suitable tool whereupon the pin may be pushed out axially from engagement with the resilient clamp and the valve body bore.

Figure 2:
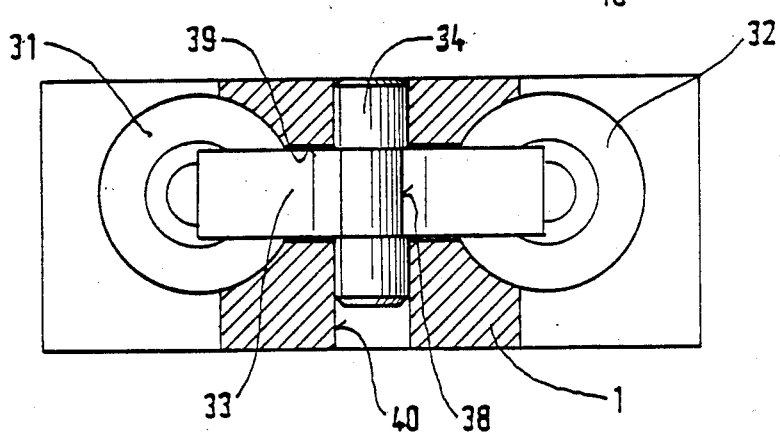

A detailed description now follows in conjunction with the appended drawing in which:

FIG. 1 is a longitudinal cross section of the overall steering assembly, valve body and valve pistons, and FIG. 2 is a section through II—II of FIG. 1.

Referring to the drawing, a valve body 1 is disclosed which will be understood to be at the end of a steering worm (not shown) and rotatably mounted in a steering housing 2. The steering worm will be understood to be conventionally connected resiliently with a steering spindle (not shown) to a torsion rod 3. A fork-shaped end (not shown) of the steering spindle carries a valve actuator pins 4 and 5 which can reciprocate valve pistons 6 and 7 of respective control valves 8 and 9 disposed transversely and eccentrically in relation to the longitudinal axis of the torsion rod, i.e., the valve piston and torsion rod axes are not coplanar.

Each control valve 8 and 9 has a respective annular inlet groove 10 and 11 connecting with a pressure inlet chamber 12. Also, each control valve 8 and 9 has a return annular groove 13 and 14, respectively, as well as respective annular grooves 15 and 16 for connection with a tank (not shown) and respective pressure chamber 17 and 18 of a servo motor 19.

The valve pistons 6 and 7 have transverse grooves 20 and 21 which accommodate respective actuator pins 4 and 5 with a slidable play. Valve pistons 6 and 7 are maintained in lines of contact engagement 23 and 24 with the actuator pins 4 and 5 by means of a resilient clamp 22 such as a bar of spring material of leaf spring or the like.

Clamp 22 is secured by a pin 25 provided with a neckdown or recessed portion 26 into which a loop formed of the clamp length is carried. Thus, the pin 25 is locked in place with respect to the clamp 26 and is fitted into a bore in valve body 1, at its ends. Construction is quite similar to that shown for clamp 33 in FIG. 2.

Axial bores 27 and 28 are provided for respective valve pistons 6 and 7 which have radial passages extending into communication with respective grooves 15 and 16 communicating with pressure chambers 17 and 18, respectively, of servo motor 19, and also communicating prevailing pressures of those pressure chambers to the reaction chambers 29 and 30 at corresponding ends of respective valve pistons 6 and 7 opposite the ends against which the clamp 22 bears. Reaction chambers 29 and 30 are closed by closure gaps 31 and 32 secured by a resilient clamp 33 in firm contact with the valve body 1 secured by the pin 34. In place of reaction chambers, damping chambers may be utilized wherein the volume may also be limited by closure caps, such as 31 and 32.

Thus, the dimensions of the closure gaps determines the volume of the reaction chambers or such other chambers the volumes of which are to be held to particular limits.

At its ends clamp 33 has generally coplanar ends 35 and 36 albeit slightly angled and having the central section formed with a loop 37 to conform to the round pin 34. Pin 34 has a recess 38 as an annular groove the edges of which abut the arcuate edges of the central loop section of the clamp 33 to secure pin 34 axially. In assembly the clamp 33 is inserted into aperture means 39 of valve body 1 and then pressed by a suitable tool to provide for insertion of pin 34 therethrough for insertion into a bore means 40 of valve body 1.

From the preceding description it will be apparent that the resilient clamp is sufficiently flexible so as to bear resiliently against the closure caps and is restrained against transverse movement by the bore means 40 while having at least a portion engaging the recess in the pin to restrain the pin against axial movement. Thus the pin and clamp are locked in place and secured against dislodgement.

We claim:

1. In a booster steering control valve of this kind having valve pistons axially shiftable in a valve body (1) and having reaction chambers at corresponding ends with respective closure gaps (31, 32) engaging the valve body including securing means for securing said closure caps to said valve body;

the improvement wherein said securing means comprises a resilient clamp (33) exerting force against said closure caps; said resilient clamp having ends (35, 36) which bear resiliently on said closure caps for securing said closure caps against said valve body; and a pin (34) engaging said resilient clamp to force resilient engagement of the ends thereof against said enclosure caps; bore means (40) in said valve body and said pin being carried in said bore means.

2. In a booster steering control valve as set forth in claim 1,
said resilient clamp having a formation (37) to encompass at least a portion of said pin.

3. In a booster steering control valve as set forth in claim 1,
said pin having a recess (38) and said resilient clamp having a portion in said recess to prevent axial movement of said pin relative to said resilient clamp.

4. In a booster steering control valve as set forth in claim 2,
said pin having a recess (38) and said resilient clamp having a portion in said recess to prevent axial movement of said pin relative to said resilient clamp.

5. In a booster steering control valve as set forth in claim 1,
said resilient clamp being disposed transversely of said pin.

6. In a booster steering control valve as set forth in claim 5,
said pin having a recess (38) and said resilient clamp having a portion in said recess to prevent axial movement of said pin to relative to said resilient clamp.

7. In a booster steering mechanism as set forth in claim 5, said valve body having aperture means (39) to receive said resilient clamp for restraining said resilient clamp against transverse movement.

* * * * *